TECHNIQUE FOR THE FABRICATION OF HAFNIUM NITRIDE RESISTOR

Original Filed Feb. 26, 1968

INVENTORS D. GERSTENBERG
F. T. J. SMITH
BY Edward W. Fink
ATTORNEY

United States Patent Office 3,647,662 Patented Mar. 7, 1972

3,647,662
TECHNIQUE FOR THE FABRICATION OF HAFNIUM NITRIDE RESISTOR

Dieter Gerstenberg, Allentown, Pa., and Frank Thomas John Smith, Bedford, Mass., assignors to Bell Telephone Laboratories, Incorporated, Murray Hill, N.J.

Original application Feb. 26, 1968, Ser. No. 708,159, now Patent No. 3,575,833, dated Apr. 20, 1971. Divided and this application June 1, 1970, Ser. No. 41,876
Int. Cl. C23c *15/00*
U.S. Cl. 204—192 4 Claims

ABSTRACT OF THE DISCLOSURE

A technique for fabricating hafnium nitride film resistors involves reactively sputtering hafnium in a nitrogen ambient upon a nonconducting substrate. Resistors fabricated in accordance with the described procedure manifest a wider range of available electrical properties such as temperature coefficient of resistance and resistivity than the widely used tantalum nitride devices.

This application is a division of copending application, Ser. No. 708,159, filed Feb. 26 ,1968, now U.S. Pat. No. 3,575,833 of Apr. 20, 1971.

This invention relates to a technique for fabricating metal film resistors incluuding a layer of hafnium nitride. More particularly, the present invention relates to a technique for fabricating hafnium nitride resistors wherein hafnium is reactively sputtered in a nitrogen ambient.

Recently, considerable interest in the micro-miniaturization field has been focused upon tantalum nitride film resistors of high stability which have been found to manifest electrical properties which compare favorably with those resistors commonly employed by the prior art workers. These structures are commonly prepared by reactively sputtering tantalum in the presence of nitrogen upon a suitable nonconducting substrate member. Although devices of this type have increased in popularity lately, inherent limitations on the range of available electrical properties have motivated a search for alternate structures.

In accordance with the present invention, the limitations alluded to hereinabove are effectively obviated by reactively sputtering hafnium upon a suitable substrate member in the presence of nitrogen at nitrogen partial pressures ranging from $10^{-4}$–$10^{-2}$ torr. Devices described herein have been found to evidence a wider range of homogeneity and, consequently, a wider range of electrical properties such as temperature coefficient of resistance and resistivity than the tantalum nitride structures. Specifically, it has been found that the resistors fabricated in accordance with the invention evidence resistivities ranging from 150–1000 microhm-centimeters over a range of temperature coefficients of resistance ranging from +500 to −500 parts per million per degree centigrade.

Figure 1:
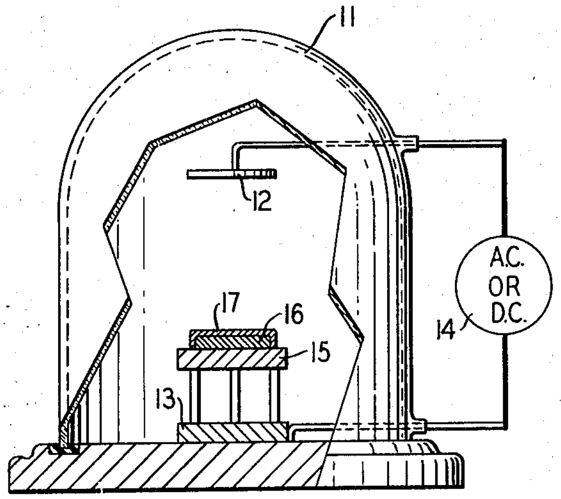
Figure 3:
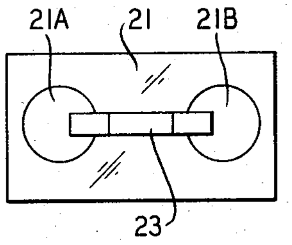
Figure 2:
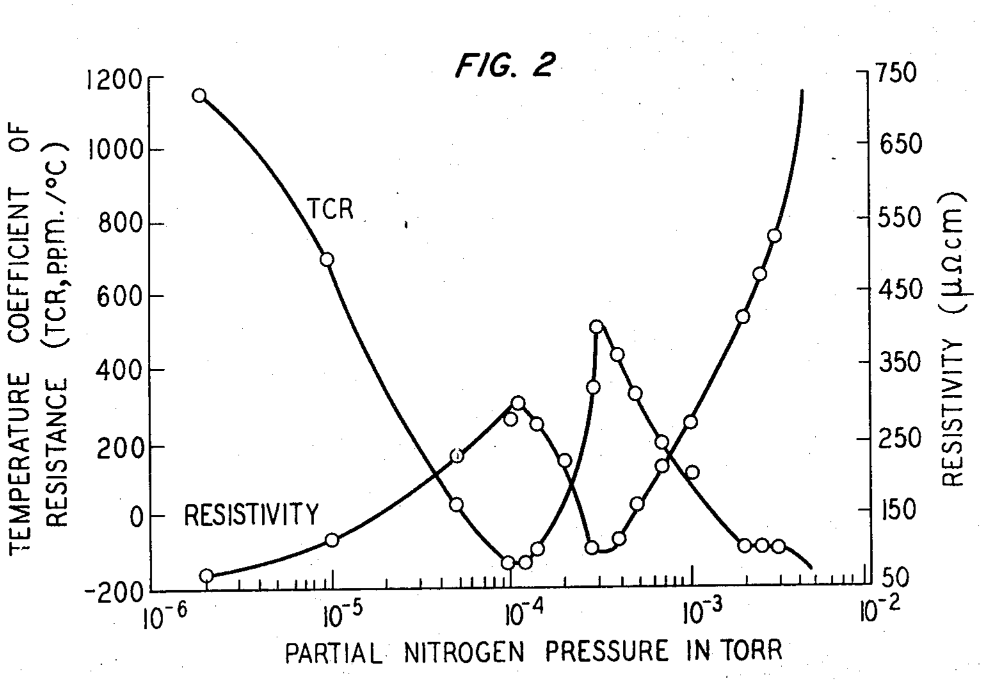

The invention will be more readily understood by reference to the following detailed description taken in conjunction with the accompanying drawing wherein:

FIG. 1 is a front elevational view partly in section of an apparatus suitable for use in producing a film of hafnium nitride by reactive sputtering in accordance with the present invention;

FIG. 2 is a graphical representation on coordinates of resistivity in microhm-centimeters and temperature coefficient of resistance in parts per million per degree centigrade against the partial pressure of nitrogen in torr showing the variations of resistivity and temperature coefficient of resistance in varying partial pressures of nitrogen at a total pressure of 20 millitorr of argon; and FIG. 3 is a plan view of hafnium nitride film resistor prepared in accordance with the present invention.

With reference now more particularly to FIG. 1, there is shown an apparatus suitable for dispositing a hafnium nitride film by cathodic sputtering. Shown in the figure is a vacuum chamber 11 in which are disposed cathode 12 and anode 13. Cathode 12 may be composed of hafnium or, alternatively, may serve as the base of the hafnium which later may be in the form of a coating, foil, or other suitable physical form.

A source of electrical potential 14 is shown connected between cathode 12 and anode 13. Platform 15 is employed as a positioning support for substrate 16 upon which the sputtered film is to be deposited. Mask 17 is placed upon substrate 16 to restrict the deposition to this area.

The present invention is conveniently described in detail by reference to an illustrative example in which hafnium is employed as cathode 12 in the apparatus shown in FIG. 1. Preferred substrate materials for the practice of the present invention are glasses, glazed ceramics, and so forth. These materials meet the requirements of heat resistance and nonconductivity essential for substrates utilized in reactive sputtering techniques.

Substrate 16 is first vigorously cleaned. Conventional cleaning agents are suitable, the choice of a specific one being dependent upon the composition of the substrate itself. For example, when the substrate consists of glass, boiling in aqua regia or hydrogen peroxide is a convenient method for cleaning the surface.

Substrate 16 is placed upon platform 15, as shown in FIG. 1 and mask 17 is then suitably positioned. Platform 15 and mask 17 may be fabricated from any refractory material. However, it may be convenient to use a metal such as aluminum for ease in the fabrication of mask 17. In order to obtain sharply defined paths, it is necessary to have mask 17 bearing upon substrate 16 under externally applied pressure.

The vacuum chamber is next evacuated and nitrogen is admitted at a dynamic pressure, and after obtaining equilibrium, argon is admitted. The extent of the vacuum is dependent upon consideration of several factors.

Increasing the inert gas pressure and thereby reducing the vacuum within chamber 11 increases the rate at which the hafnium being sputtered is removed from the cathode and, accordingly, increases the rate of deposition. The maximum pressure is usually dictated by power supply limitations since increasing the pressure also increases the the current flow between cathode 13 and anode 12. A practical upper limit in this respect is 20 millitorr for a sputtering voltage of 3000 volts, although it may be varied depending on the size of the cathode sputtering rate, and so forth. The ultimate maximum pressure is that at which the sputtering can be reasonably controlled within the prescribed tolerances. It follows from the above discussion that the minimum pressure is determined by the lowest deposition rate which can be economically tolerated.

After the requisite pressure is obtained, cathode 12 which may be composed by hafnium or, alternatively, may be an aluminum disk covered with hafnium, for example, in the form of a foil, is made electrically negative with respect to anode 13.

The minimum voltage necessary to produce sputtering is about 3000 volts. Increasing the potential difference between anode 13 and cathode 12 has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations are well known and have been given names as, for example, Crooke's Dark Space (see Joos Theoretical Physics—Hafner, New York, 1950, page 435 etc.). For the best efficiency during the sputtering step, substrate 16 should be positioned immediately without the Crooke's Dark Space on the side closest to the anode 13. Location of substrate 16 closer to cathode 12 results in a metal deposit of poorer quality. Locating substrate 16 further from cathode 12 results in the impingement on the substrate by a smaller fraction of the total metal sputtered, thereby increasing the time necessary to produce a deposit of given thickness.

It should be noted that the location of Crooke's Dark Space changes with variations in the pressure, it moving closer to the cathode with increasing pressure, as the substrate is moved closer to the cathode at times to act as an obstacle in the path of gas ions which are bombarding the cathode. Accordingly, the pressure should be maintained sufficiently low so that Crooke's Dark Space is located upon the point at which a substrate would cause shielding of the cathode.

The balancing of these various factors are voltage, pressure, and relative position of the cathode, anode, and substrate to obtain a high quality deposit is well known in the sputtering art.

With reference now more particularly to the example under discussion, by employing a proper voltage, pressure, and spacing of the various elements within the vacuum chamber, a layer of hafnium nitride is deposited in a configuration determined by mask 17. The sputtering is conducted for a period of time calculated to produce the desired thickness.

For the purposes of this invention, the minimum thickness of the layer deposited upon the substrate is approximately 400 A. There is no maximum limit on this thickness although little advantage is gained by an increase upon 1500 A.

FIG. 2 is a graphical representation showing the resistivity in microhm centrimeters and temperature coefficient of resistance in parts per million per degree centigrade against the partial pressure of nitrogen in torr. The points on the graph represent the average over the inner six resistor strips on Nichrome-gold terminated 1" x 3" glass slides which have been sputtered at a temperature of 350° C. at 4.0 kilovolts at a current density of 0.43 milliampere per square centimeter.

It is noted from the graph that at partial nitrogen pressures appreciably below $10^{-5}$ torr there is little change in resistivity accompanied by a large increase in the temperature coefficient of resistance from +700 parts per million per degree centigrade to +1200 parts per million per degree centigrade. Above a partial pressure of nitrogen of $10^{-5}$ torr, the resistivity increases from 100 microhm centimeters to a peak of 300 microhm-centimeters, corresponding with a partial pressure of $10^{-4}$ torr. Thereafter, resistivity decreases to a low point of approximately 100 microhm-centimeters and rapidly increases to values greater than 1200 microhm-centimeters at partial pressures of the order of $10^{-2}$ torr. It has been found that the temperature coefficient of resistance fluctuates from approximately +500 parts per million per degree centigrade to −500 parts per million per degree centrigrade over a partial nitrogen pressure range of $10^{-4}$–$10^{-2}$. In analyzing the data shown graphically in the figure, it must be noted that the indicated pressures are specific to the pumping speed of the particular vacuum system employed. Thus, it may be stated that the present invention is operable over a partial pressure of nitrogen range of $10^{-4}$–$10^{-2}$ torr.

In FIG. 3 there is shown a substrate member 21 composed of one of the refractory insulating materials usually employed in the construction of printed circuit boards which has deposited thereon two terminals, 21A and 21B, of electrically conductive metal such as gold and a layer 23 of hafnium nitride. Conductive terminals 21A and 21B are not essential but are customarily employed in the construction of printed circuit boards. With reference once again to the example under discussion, the substrate is maintained at temperatures within the range of 300–500° C. during the reactive sputtering process. Following the deposition technique, the hafnium nitride film is heated to a temperature within the range of 250–400° C. in the presence of air, thereby stabilizing the nitride film. Electron diffraction studies indicate that reactive sputtering of hafnium nitride films have properties suitable for resistor purposes and, when produced in accordance with the technique described herein, are of a face-centered cubic structure (HfN).

Several examples of the present invention are described in detail below. These examples and the illustration described above are included merely to aid in the understanding of the invention and variations may be made by one skilled in the art without departing from the spirit and scope of the invention.

EXAMPLE I

This example describes the fabrication of a hafnium nitride resistor in accordance with the present inventive technique.

A sputtering apparatus similar to that shown in FIG. 1 was used to produce the hafnium nitride layer. The cathode consisted of a circular halfnium disk 10 centimeters in diameter of high purity. In the apparatus actually employed, the anode was grounded, the potential difference being obtained by making the cathode negative with respect to ground.

A glass microscope slide, approximately 1" in width and 3" in length was used as a substrate. Nichrome gold terminals were evaporated on each longitudinal side of the substrate. The terminated slide was then cleaned using the following procedure. Initially, the slide was washed in a detergent to remove large particles of dirt and grease. Next, there followed a tap water rinse, a 10 minute boil in a 10 percent hydrogen peroxide solution, a distilled water rinse, a 10 minute boil in distilled water, and storage in an oven maintained at 150° C. until ready for use.

The vacuum chamber was evacuated by means of an oil diffusion pump to a pressure of approximately $5 \times 10^{-6}$ torr after a time period within the range of 15 to 45 minutes. Next, the substrate was heated to a temperature of approximately 400° C. at which point nitrogen was admitted into the chamber at a dynamic pressure, and after attaining equilibrium, argon was admitted into the chamber at a pressure of approximately $20 \times 10^{-3}$ torr. During the sputtering reaction, the partial pressure of the nitrogen was maintained at approximately $2 \times 10^{-3}$ torr.

The anode and cathode were spaced approximately 2½" apart, the cleansed substrate being placed therebetween at a position immediately with the Crooke's Dark Space. The substrate was maintained at a temperature of 350° C. during the sputtering reaction. A D-C voltage of 4000 volts was impressed between cathode and anode at a current density of 0.43 milliampere per square centimeter. In order to establish equilibrium when first beginning the sputtering operation, it was found helpful to sputter on a shield for several minutes thereby issuing reproducible results. Sputtering was conducted for approximately 8 minutes, resulting in a layer of approximately 1100 A. in thickness.

Following the sputtering treatment, the resistance in ohms and specific resistivity in microhm-centimeters was measured. Next, the sputtered resistor was heated in air for 1 hour at a temperature of 425° C. The device so fabricated was again measured to determine its resistance. Stability of the resistor was determined by power aging at 1 volt for approximately 1000 hours. The results are set forth in the table below together with the results obtained by repetition of the foregoing procedure. Each of the results set forth in the table is to be considered as an independent example.

TABLE

| | F.T.[1] in A. | $PN_2$[2] in torr | Initial R in ohms | Res in ohms after heat treat. | ΔR 90 (425° C.) after— 24 hrs. | 108 hrs. | 504 hrs. | 1,008 hrs. |
|---|---|---|---|---|---|---|---|---|
| (1) | 1,100 | $2\times10^{-3}$ | 2,705 | 2,789 | 0.118 | 0.191 | 0.225 | 0.228 |
| (2) | 1,100 | $2\times10^{-3}$ | 2,442 | 2,518 | 0.106 | 0.182 | 0.218 | 0.265 |
| (3) | 1,100 | $2\times10^{-3}$ | 2,472 | 2,549 | 0.122 | 0.192 | 0.239 | 0.290 |
| (4) | 1,100 | $2\times10^{-3}$ | 2,576 | 2,656 | 0.113 | 0.181 | 0.225 | 0.270 |
| (5) | 1,100 | $2\times10^{-3}$ | 3,519 | 3,628 | 0.102 | 0.153 | 0.168 | 0.230 |

[1] F.T.=Film thickness.
[2] $PN_2$=Partial pressure of nitrogen.

Analysis of the data set forth in the table indicates that the resistance of the hafnium nitride films prepared in accordance with the invention are appreciably enhanced by the heat treatment, so producing a uniquely stable resistor as noted from the aging data. Furthermore, as may be seen by reference to FIG. 2, the hafnium nitride films manifest resistivities ranging from 150–1000 microhm-centimeters over the nitrogen partial pressure range of interest herein, whereas the temperature coefficient of resistance over this range varies only from +500 to −500 parts per million per degree centigrade. This behavior is superior to that of tantalum nitride which shows only modest changes in resistivity and temperature coefficient of resistance over the nitrogen partial pressure ranges employed in the fabrication of such structures.

We claim:

1. A method for the fabrication of a thin film resistor manifesting a resistivity within the range of 150 to 1000 microhm centimeters over a range of temperature coefficients of resistance ranging from +500 to −500 parts per million per degree centigrade, which comprises depositing a layer of hafnium nitride upon a nonconducting substrate member by sputtering hafnium in a nitrogen ambient, the partial pressure of nitrogen being maintained within the range of $10^{-4}$ to $10^{-2}$ torr.

2. Method in accordance with claim 1 wherein the said hafnium nitride has a face-centered cubic structure.

3. Method in accordance with claim 2 wherein said substrate member is glass.

4. Method in accordance with claim 3 wherein the partial pressure of nitrogen is $2\times10^{-3}$ torr.

References Cited

UNITED STATES PATENTS 3,242,006 3/1966 Gerstenberg ---------- 204—192
3,233,988 2/1966 Wentorf et al. --------- 23—191
3,170,810 2/1965 Kagan --------------- 204—192

FOREIGN PATENTS 603,282 8/1960 Canada --------------- 23—191

JOHN H. MACK, Primary Examiner
S. S. KANTER, Assistant Examiner